Feb. 24, 1959 W. W. ORJALA 2,874,489
TOOL ATTACHING DEVICE
Filed June 19, 1957 2 Sheets-Sheet 1
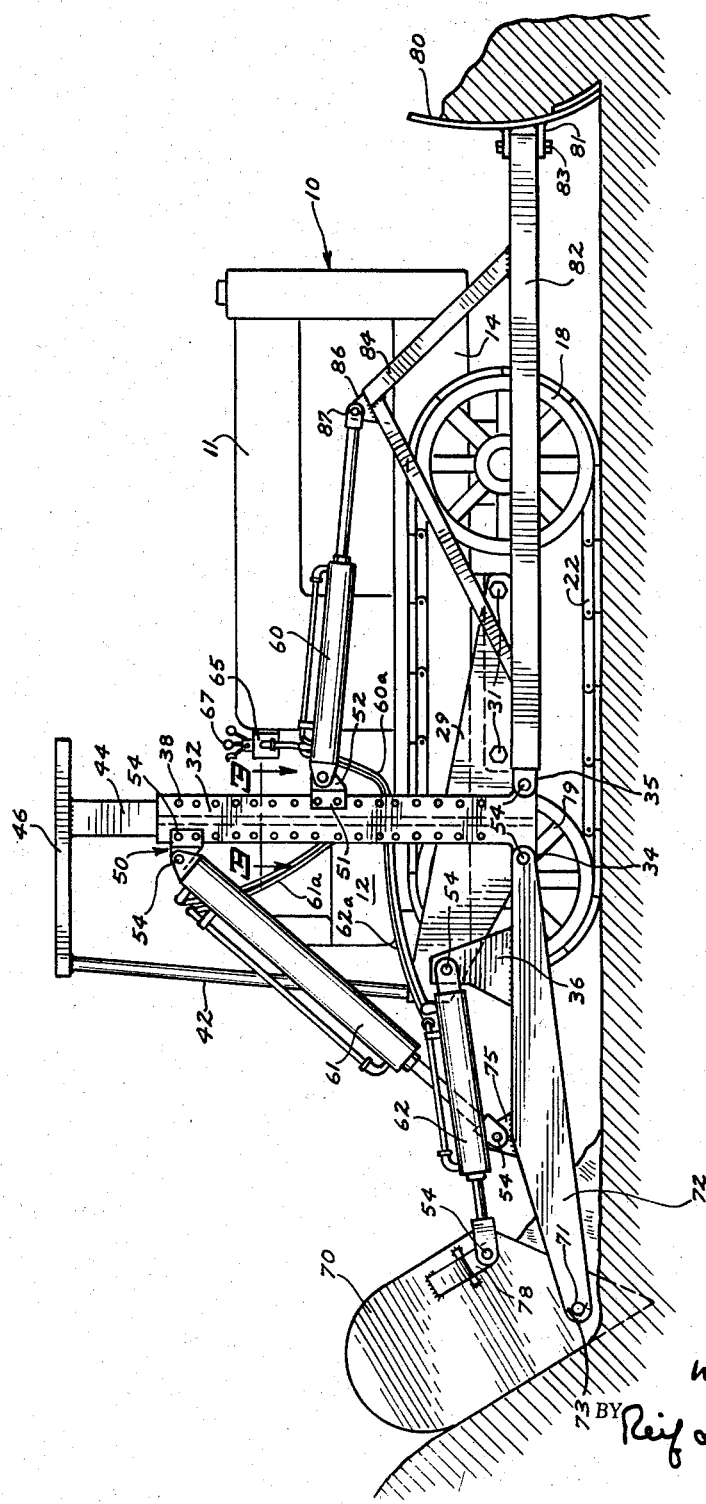
INVENTOR.
WAYNE W. ORJALA
BY Reif and Gregory
ATTORNEYS Feb. 24, 1959  W. W. ORJALA  2,874,489
TOOL ATTACHING DEVICE
Filed June 19, 1957  2 Sheets-Sheet 2
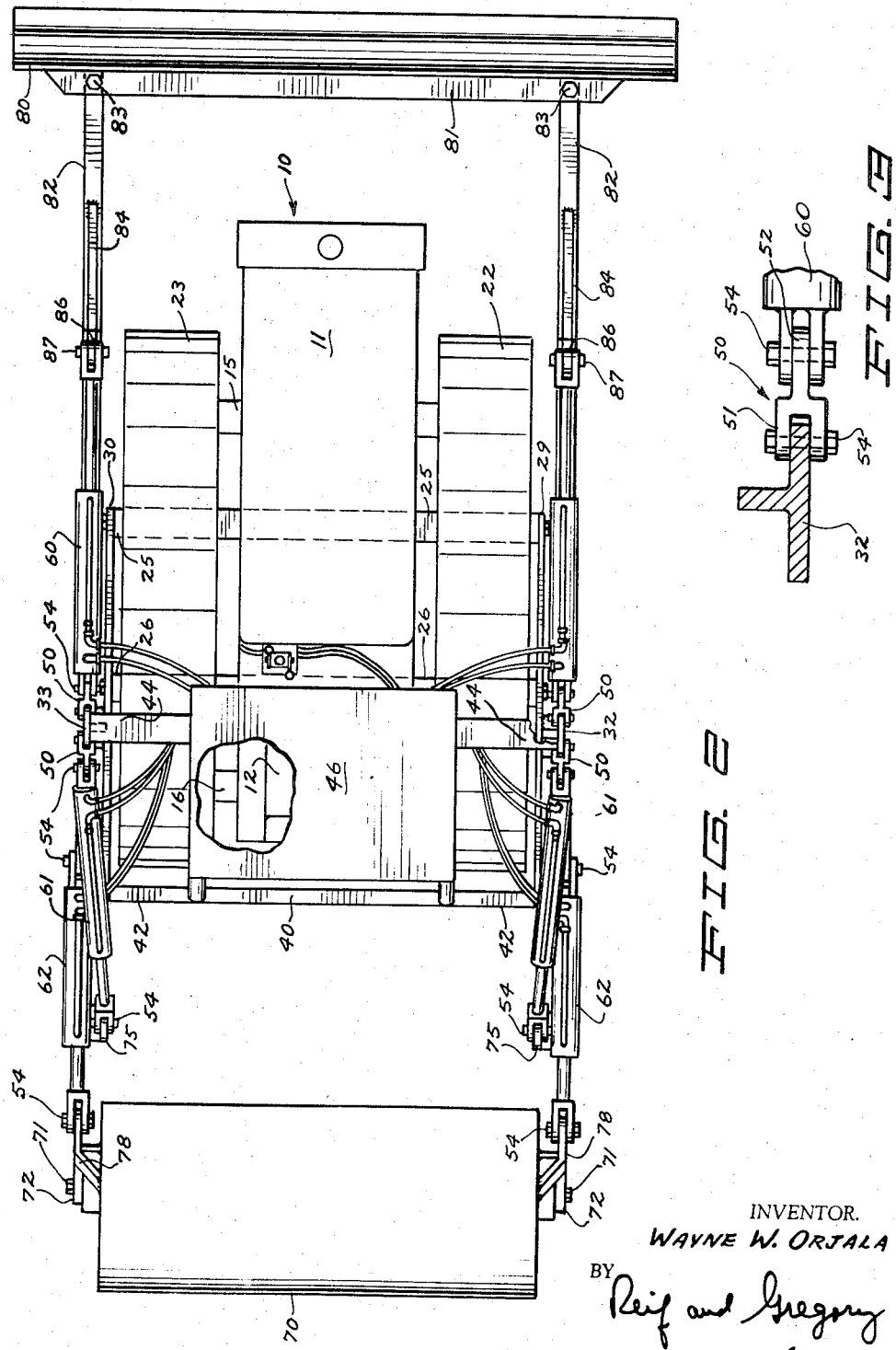
INVENTOR.
WAYNE W. ORJALA
BY
*Reif and Gregory*
ATTORNEYS

United States Patent Office 2,874,489
Patented Feb. 24, 1959

2,874,489

TOOL ATTACHING DEVICE

Wayne W. Orjala, McGregor, Minn.

Application June 19, 1957, Serial No. 666,706

4 Claims. (Cl. 37—117.5)

This invention has to do with an improvement in apparatus to be used in connection with a tractor for interchangeably attaching tools thereto for operation therewith. More specifically reference is had to a crawler type tractor. Particular reference is had to the use and operation of a medium sized tractor adapted to be used in a variety of jobs and in jobs where a plurality of different tools will be required to be used with and operated by said tractor, said tools being such as excavating, bulldozing, hole digging, grading tools and the like.

In practice a different type of attaching and operating means is generally required for each of such tools used. Thus the changeover from one tool to another is often a laborious and time consuming task and requires the operator to have on hand a plurality of connecting and operating means for handling said tools. Where it is desirable to mount a tool rearwardly of the tractor and another tool forwardly of the tractor, it is generally necessary to have a different type of attaching and operating means for each of these tools.

It is desirable therefore to have apparatus which is adapted to serve as a common tool attaching and a common tool operating means usable in connection with the various tools which may be interchangeably attached thereto singly or in combination in connection with a tractor. Thus a single tractor will acquire a desirable and ready flexibility in use.

It is an object of this invention to provide an apparatus comprising a tool attaching and tool operating means usable in connection with a tractor, such as a crawler type tractor, and adapted to have interchangeably attached thereto one or more of a plurality of tools.

It is another object of this invention to provide a framework for a tractor, a pair of transversely spaced upstanding members secured to said framework at either side of said tractor and adapted to have tools interchangeably attached thereto, and tool operating means connecting said tools to said members at certain desired heights of said members for the operation of said tools.

It is a further object of this invention to provide a framework for a tractor engaging either side thereof, a pair of upstanding members secured to said framework at either side of said tractor, said upstanding members having connecting means adapted to be secured thereto at different heights thereof, and means at the base portion of said upstanding members for the attachment of tools thereto whereby tools to be used interchangeably with said tractor are adapted to be pivoted to the base of said members, and operating means connecting said tools and said connecting means at a desired height of said upstanding members for the operation of said tools.

It is a more specific object of this invention to provide an apparatus for a tractor comprising a framework having portions secured to either side of said tractor, a pair of upstanding members respectively secured to said portions of said framework, said upstanding members respectively having a widened base portion and having vertically spaced apertures extending therealong, connecting means adapted to be secured to said upstanding members through said apertures at desired heights of said members, link members adapted to be pivotally secured at one end to the base portions of said upstanding members and adapted to have tools interchangeably connected to their other ends, and operating means connecting said link members to said connecting means for operating said tools.

It is also an object of this invention to provide said upstanding members set forth in the preceding object with vertically spaced horizontal pairs of apertures whereby tools may be attached simultaneously at either side of said upstanding members for use at either end of said tractor, and link members connecting said tools and said upstanding members for simultaneous or cooperative operation of said tools.

These and other objects and advantages of the invention will be fully set forth in the following description made in connection with the accompanying drawings in which like reference characters refer to similar parts throughout the several views and in which:

Fig. 1 is a view of applicant's device in side elevation in operating position with some parts shown in dotted line;

Fig. 2 is a top plan view of applicant's device as shown in Fig. 1; and

Fig. 3 is a view on an enlarged scale in horizontal section taken on line 3—3 of Fig. 1, as indicated by the arrows.

With reference to the drawings, a tractor 10 is shown. While applicant's device may be adapted to be used with various types of self propelled vehicles, it is here shown in connection with the type of tractor known as a crawler type tractor. The tractor itself as such forms no part of the applicant's invention and is therefore referred to only generally.

Said tractor 10 comprises a hood portion 11 which will have a motor mounted therein and a seat 12 rearwardly of said hood portion, with said hood portion and said seat being supported on a chassis 14. Said chassis is supported on transversely extending frame members 15 and 16 to the ends of which are respectively journaled forward wheels 18 and rearward driving wheels 19. Respectively secured about pairs of said wheels at either side of said tractor 10 are endless belts 22 and 23.

Extending transversely of said chassis 14 are heavy additional frame members 25 and 26. Said frame members 25 and 26 extend outwardly slightly at either side of said tractor 10. Respectively secured at either side of said tractor 10 to the ends of said members 25 and 26 are plate members 29 and 30. While said plate members may be variously formed, in the embodiment of the invention here illustrated they are indicated as being heavy stress resisting members substantially triangular shaped in plan having one edge portion thereof in horizontal position. Said plate members will be respectively secured to the ends of said cross members 25 and 26, as by bolts 31. Said plate members 29 and 30 are shown extending from a point substantially centrally of said tractor to a point rearwardly of said tractor. The outer ends of said plate members are connected by a frame member 40.

Upstanding from said plate members 29 and 30 in transverse alignment at either side of said tractor are upstanding members or posts 32 and 33 which in the embodiment of the invention here illustrated are shown as being formed of T-shaped members with the face portions of said upstanding members being remote one from the other. The T-rib will be of substantial width. Said posts 32 and 33 are secured at their lower portions by means of said T-rib to said plate members 29 and 30, as by welding, so as to be rigid therewith. At the base portion of post 32 are apertured stub portions 34 and 35 extending at either side thereof longitudinally of said tractor. Said post 33 will be of identical construction as said post 32 but its base portion is not here shown.

Upstanding from said cross member 40 are a pair of transversely spaced posts 42. Upstanding from said posts 32 and 33 and angled inwardly toward each other are extension portions 44 of reduced dimension. Said posts 42 and extension portions 44 support and have secured thereon a canopy 46 which extends substantially over the operator's seat 12. Said frame portions 44 add to the rigidity of said posts 32 and 33.

Said posts 32 and 33 are adapted to have connecting means attached thereto at different heights thereof. While this may be accomplished in various ways, in the embodiment of the invention here illustrated, said posts will have respectively in their face portions a plurality of vertically spaced pairs of apertures for the attachment of connecting means. Apertures 38 in post 32 are shown. Though said apertures are here shown to be evenly spaced, they may be spaced otherwise.

Adapted to be removably connected to said posts 32 and 33 are connecting members or lugs 50 here illustrated as being formed having apertured bifurcated portions 51 adapted to be disposed over the edges of the face portions of posts 32 and 33 with said apertures therein adapted to be in alignment with the apertures in said posts. Said bifurcated portions shown have vertically spaced pairs of apertures to be secured in position by bolts 54. Thus said members 50 may be secured to said posts 32 and 33 at any desired height thereof. Extending oppositely of said bifurcated portion 51 is a single apertured plate portion 52.

Removably atached to said posts 32 and 33 are pairs of tool operating members 60, 61 and 62. Said operating members may vary in the number being used at any given time. In the embodiment of the invention here illustrated, said operating members are shown formed as double acting hydraulic cylinders which are of a well known construction. Tubes or conduits 60a, 61a and 62a respectively are shown connecting said cylinders to the control panel 65 mounted on the hood 11 of said tractor 10. Said control panel 65 is equipped with controls or levers 67 to actuate and operate said hydraulic cylinders. Said hydraulic cylinders are indicated as being provided with bifurcated end portions and are adapted to be removably pivoted at one end to said portions 52 of connecting lugs 50, as by bolts 54. As here shown, said hydraulic cylinders are used in pairs, but in a modified application may be used otherwise. Hydraulic cylinders 61 are indicated as being somewhat greater in length than cylinder 60 or 62.

In the embodiment of the invention here illustrated, tool connecting members are shown formed as pairs of links 72 and 82. Said links are formed generally as elongated members of relatively small transverse dimension. Links 72 are shown being somewhat triangular in plan and having bifurcated inner ends adapted to be pivoted to said posts 32 and 33 at any certain desired height, but in the embodiment of the invention here illustrated, are shown to be pivoted to the apertured base portions of posts 32 and 33 by bolts 54.

Said links 72 are adapted to have removably attached thereto at their outer end portions a plurality of tools for interchangeable use. Said tools may be excavating tools, bulldozers, grading tools of various kinds, cultivating tools, trench diggers, hole diggers and the like. A scoop or excavating tool 70 is here shown equipped with studs 71 on which are journaled the outer ends of said links 72 and secured thereon by cotter keys 73.

Said links 72 are shown having apertured upstanding lugs 75 to which are removably pivoted the other ends of said cylinders 61 by bolts 54, and links 72 will be readily raised or lowered by said cylinders 61.

Effective direct manipulation of or control over said tool 70 is had by means of hydraulic cylinders 62. Said cylinders are connected at one end to lugs 78 on tool 70 by bolts 54 and are connected at their other ends to upstanding lugs 36 by bolts 54. Said lugs are integral with said links 72 adjacent their inner end portions.

Said tool 70 is adapted to be readily detached and replaced by another or other tools adapted to be attached in a like manner.

While not always necessary or even desirable, in the embodiment of the invention here illustrated, a second tool 80 is shown attached in operating position for cooperative use with said tool 70.

A pair of links 82 substantially rectangular in cross section have bifurcated inner ends for attachment and are here shown pivoted to the stub portions of the base portions of posts 32 and 33 by bolts 54. Said links are shown extending forwardly of said tractor 10 for a short distance. An upstanding angular bracket 84 is secured to each of said links 82. Said brackets carry apertured lugs 86 at their upper portions. The outer ends of cylinders 60 are pivoted to said lugs by bolts 54. Said cylinders at their inner ends are secured to lugs 50 by bolts at desired heights on posts 32 and 33.

Said tool 80 by means of its bracket 81 is removably secured to the outer ends of links 82 by bolts 83. The outer ends of said links 82 will be apertured to permit the passage therethrough of said bolts.

In operation, said tools 70 and 80 will be placed in working position as described above. Said tools will be manipulated by means of said hydraulic cylinders 60, 61 and 62 in a manner well known in the art.

Links 72 and 82 are manipulated about the points at which they are journaled to said posts 32 and 33, which points become fulcrum points. The height or the extent it may be desirable to raise either links 72 or 82 is readily controlled by securing lugs 50 to said posts 32 and 33 at a particular height or point and by securing said links 72 and/or 82 at the base portions of said posts or at any desired height thereon, and said links may be pivoted to said posts above as well as below the points at which said hydraulic cylinders are pivoted to said posts. Further flexibility is acquired by the interchange of the hydraulic cylinders used, they being of varying lengths. For still further flexibility the links 72 and 82 are usable interchangeably. Thus there is a great flexibility in the positioning and exchange of various parts, all of which provides great versatility in the use of tools in connection with a tractor such as indicated.

Thus it is seen that applicant has provided an apparatus having a high degree of utility by being adapted not only to have tools interchangeably attached thereto, but additionally by having its various parts usable interchangeably to secure a desirable operation in the handling and use of a plurality of tools. Applicant's apparatus thus adds substantially to the various applications of work to which a tractor may be put.

It will of course be understood that various changes may be made in the form, details, arrangement and proportions of the parts, without departing from the scope of applicant's invention, which, generally stated, consists in an apparatus capable of carrying out the objects above set forth, in the parts and combinations of parts disclosed and defined in the appended claims.

What is claimed is:

1. An attachment for operatively connecting tools to a tractor having in combination, a frame secured to said tractor, said frame comprising a plate member secured at either side of said tractor, a post integral with each of said plate members and upstanding therefrom, said posts having flanges extending at either side thereof for substantially the full height of said posts, said flanges respectively having vertically spaced apertures therein, lugs having bifurcated portions adapted to be disposed about said flanges at one side of said posts and having aligned apertures therethrough to be in register with said apertures in said flanges whereby said lugs are adapted to be secured to said posts at different points thereon, a pair of link members adapted to have their inner ends pivoted to the base portions of said posts and adapted to have a tool removably secured to their outer ends at one end of said tractor, and a pair of hydraulic cylinders connected at one end to said lugs and connected at their other ends to said link members for manipulating the same to operate said tool.

2. An attachment for operatively connecting tools to a tractor having in combination, a frame connected to said tractor, said frame comprising a plate member secured at either side of said tractor, a post integral with each of said plate members and upstanding therefrom, a flange extending outwardly at either side of said post, said flanges respectively having vertically spaced apertures therein, lugs having apertured bifurcated portions adapted to be secured to said flanges at either side of said posts through the apertures therein at different points of height thereon, a pair of link members having their inner ends pivoted to the base portions of said posts at one side thereof, said link members having their outer ends adapted to have a tool removably secured thereto, a pair of hydraulic cylinders connecting said link members at a point remote from the inner ends of said link members to said lugs at the near sides of said posts for manipulating said link members and the tool connected thereto, a second pair of link members having their inner ends pivoted to the base portions of said posts at their other sides, said second link members having their outer ends adapted to have a tool removably secured thereto, a second pair of hydraulic cylinders connecting said second link members at a point remote from the inner ends of said second link members to said lugs at the near sides of said posts for manipulating said second link members and the tool connected thereto whereby said first and second pairs of link members and the tools respectively connected thereto are cooperatively manipulated and operated.

3. The structure set forth in claim 2, including a second pair of hydraulic cylinders for connecting said first mentioned tool and said first mention link members for further manipulation and operation of said first mentioned tool.

4. An attachment for operatively connecting tools to a tractor having in combination, a frame connected to said tractor, said frame comprising a plate member secured at either side of said tractor, a post integral with each of said plate members and upstanding therefrom, a flange extending outwardly at either side of said posts, said flanges respectively having vertically spaced apertures therein, lugs having apertured bifurcated portions adapted to be secured to said flanges at either side of said posts through the apertures therein at different points of height thereon, a pair of link members having their inner ends pivoted at certain different desired heights on said posts through the apertures in said flanges thereon at one side thereof, said link members having their outer ends adapted to have a tool removably secured thereto, a pair of hydraulic cylinders connecting said link members at a point removed from the inner ends of said link members to said lugs at the near sides of said posts for manipulating said link members and the tool connected thereto, a second pair of link members having their inner ends pivoted at certain different desired heights on said posts through the apertures in said flanges thereon at their other sides, said second link members having their outer ends adapted to have a tool removably secured thereto, a second pair of hydraulic cylinders connecting said second link members at a point removed from the inner ends of said second link members to said lugs at the near sides of said posts for manipulating said second link members and the tool connected thereto whereby said first and second pairs of link members and the tools respectively connected thereto are cooperatively manipulated and operated.

References Cited in the file of this patent
UNITED STATES PATENTS

| | | |
|---|---|---|
| 2,001,803 | Stephens | May 21, 1935 |
| 2,296,827 | Andersen et al. | Sept. 29, 1942 |
| 2,300,843 | Norwood et al. | Nov. 3, 1942 |
| 2,429,717 | Gordon | Oct. 28, 1947 |
| 2,451,348 | Miller | Oct. 12, 1948 |
| 2,469,615 | Templeton | May 10, 1949 |
| 2,717,655 | Pilch | Sept. 13, 1955 |
| 2,798,626 | Lapsley | July 9, 1957 |